US006963051B2

(12) United States Patent
You

(10) Patent No.: US 6,963,051 B2
(45) Date of Patent: Nov. 8, 2005

(54) SLOW COOKER

(76) Inventor: Jin You, West Expressway EXIT, Beidou, Guangzhou-Zhanjiang Highway, Guandu Town, Zhanjiang, Guangdong (CN), 524051

( * ) Notice: Subject to any disclaimer, the term of this patent is extended or adjusted under 35 U.S.C. 154(b) by 0 days.

(21) Appl. No.: 10/860,122

(22) Filed: Jun. 4, 2004

(65) Prior Publication Data

US 2005/0139589 A1 Jun. 30, 2005

(30) Foreign Application Priority Data

Dec. 31, 2003 (CN) .................................. 200320113781 U

(51) Int. Cl.⁷ .......................... A47J 27/00; A47J 36/16; A47J 36/34

(52) U.S. Cl. ...................... 219/436; 219/432; 219/433

(58) Field of Search .................................. 219/436, 432, 219/433, 429, 438; 99/403

(56) References Cited

U.S. PATENT DOCUMENTS

| | | | | |
|---|---|---|---|---|
| 3,678,248 A | * | 7/1972 | Tricault et al. | ............. 219/525 |
| 3,908,111 A | * | 9/1975 | Du Bois et al. | ............. 219/442 |
| 5,429,039 A | * | 7/1995 | Chang | .......................... 99/337 |
| 6,140,614 A | * | 10/2000 | Padamsee | ..................... 219/438 |
| 6,177,655 B1 | * | 1/2001 | Toman | ...................... 219/432 |
| 6,274,847 B1 | * | 8/2001 | Hlava et al. | ................. 219/433 |
| 6,283,014 B1 | * | 9/2001 | Ng et al. | ....................... 99/330 |
| 6,498,323 B1 | * | 12/2002 | Robertson et al. | .......... 219/433 |
| 6,509,550 B1 | * | 1/2003 | Li | ............................... 219/433 |

FOREIGN PATENT DOCUMENTS

| | | |
|---|---|---|
| JP | 61-268217 | 11/1986 |
| ZA | 8104132 | 7/1982 |

* cited by examiner

Primary Examiner—Joseph Pelham
(74) Attorney, Agent, or Firm—Min, Hsieh & Hack LLP

(57) ABSTRACT

This invention discloses an electrical slow cooker. Said slow cooker has an added thermal insulating layer, which is formed by filling foaming materials in the gap between the shell and the inner casing as well as between the pedestal and the inner casing, so as to improve the quality of the thermal insulation of the slow cooker.

20 Claims, 3 Drawing Sheets

SLOW COOKER

TECHNICAL FIELD

The present invention relates to a slow cooker and it relates more particularly to an electrical slow cooker with an improved thermal insulating layer.

BACKGROUND OF THE PRESENT INVENTION

A slow cooker is a culinary utensil, suitable for use in the oriental cuisine and especially suitable for use in Chinese stewing cuisine generally by cooking over a slow fire. An ordinary slow cooker is composed mainly of the body of the slow cooker, a heater and the thermal insulating layer outside the main body. When it is used, the heater slowly transmits heat to the main body while the thermal insulating layer outside of the main body maintains the main body's inner temperature to allow the water inside to be slowly heated for a sustained period of time so that food inside can be well stewed.

Prior art slow cookers mostly consist of a lid, a porcelain container (the main body), an inner casing (heat transmission medium), a heater, a shell (thermal insulating layer) and a pedestal. The porcelain container is in the innermost space, and the inner casing with a heater and the shell are one after another in the outer space of the porcelain container. The porcelain container is covered with a lid. When used, the heater transmits heat to the porcelain container so that food inside can be heated.

The prior art slow cooker has the following shortcomings: First, there is air in the gap between the shell and the inner casing. Since air does not possess superb heat-proof quality, a large amount of heat is transmitted through the air to the shell, and by heat radiation to the shell, and further to the outside air, which results in a high temperature of the shell and a huge loss of heat thereby having poor warmth-keeping effects.

Second, there is a gap of 2–4 mm between the inner casing and the porcelain container, which reduces heat conduction from the inner casing to the porcelain container.

SUMMARY OF THE PRESENT INVENTION

The objective of this invention is to overcome the shortcomings of the prior art by providing a slow cooker with higher warmth-keeping and heat-conduction qualities.

This invention provides a slow cooker comprising a lid, a porcelain container, a shell, an inner casing, a pedestal and a heater. The porcelain container is in the innermost space, and the inner casing with the heater and the shell are one after another in the outer space of the porcelain container, wherein said slow cooker further comprises a thermal insulating layer, which is formed by filling foaming materials to the gap between the shell and the inner casing as well as between the pedestal and the inner casing.

In the present invention, the foaming materials are filled in the gap between the shell and the inner casing as well as between the pedestal and the inner casing. Since the heat-proof quality of the foaming materials is better than that of air, the slow cooker possesses a better warmth-keeping property than that of the prior art slow cooker. In addition, the foaming materials themselves have sound elasticity, which may diminish the gap between the porcelain container and the inner casing when the porcelain container is put into the inner casing. Thus, the heat transmission property from the inner casing to the porcelain container is highly improved.

In accordance with this invention, a heat-proof ring may be added to the upper portion of the shell and the inner casing so as to further enhance the warmth-keeping effects.

In this invention, a heating case with the heater may also be added, which is directly connected to the porcelain container. Said heating case directly transmits heat to the porcelain container so as to avoid loss of heat in the transmission process.

The shape of the heater may be a plate, circular plate or circular tube.

It is to be understood that both the foregoing general description and the following description of various embodiments are exemplary and explanatory only and are not restrictive.

EMBODIMENTS OF THIS INVENTION

The present invention is further described in combination with the drawings.

Figure 1:
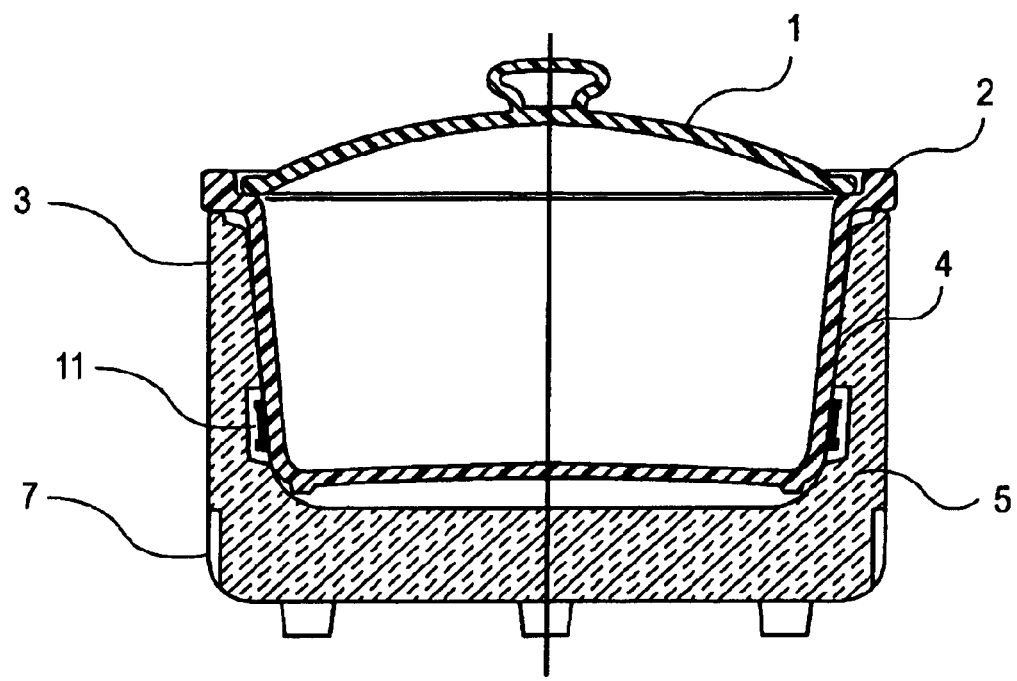
FIG. 1 is a drawing showing the structure of the embodiment of the slow cooker of this invention.

As shown in FIG. 1, a slow cooker is comprised of a lid 1, porcelain container 2, shell 3, inner casing 4, thermal insulating layer 5, pedestal 7 and heater 11. The porcelain container is in the innermost space, and the inner casing with a heater and the shell are one after another in the outer space of the porcelain container. Said thermal insulating layer is formed by filling polyurethane material or other foaming materials in the gap between shell 3 and inner casing 4 as well as between pedestal 7 and inner casing 4. Said heater 11 is fixed onto inner casing 4.

Figure 2:
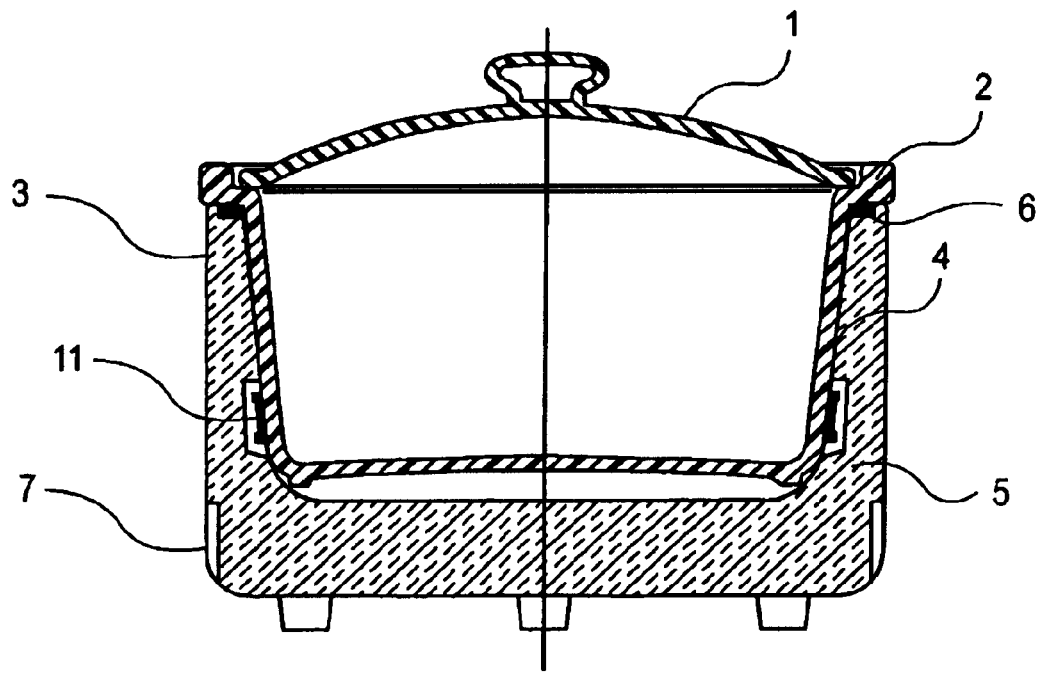
FIG. 2 is a drawing showing the structure of another embodiment of the slow cooker of this invention.

As shown in FIG. 2, a slow cooker comprises lid 1, porcelain container 2, shell 3, inner casing 4, thermal insulating layer 5, heat-proof ring 6, pedestal 7 and heater 11. The porcelain container is in the innermost space, and the inner casing with a heater and the shell are one after another in the outer space of the porcelain container. The heat-proof ring 6 is installed on the upper portion of the shell 3 and inner casing 4.

Figure 3:
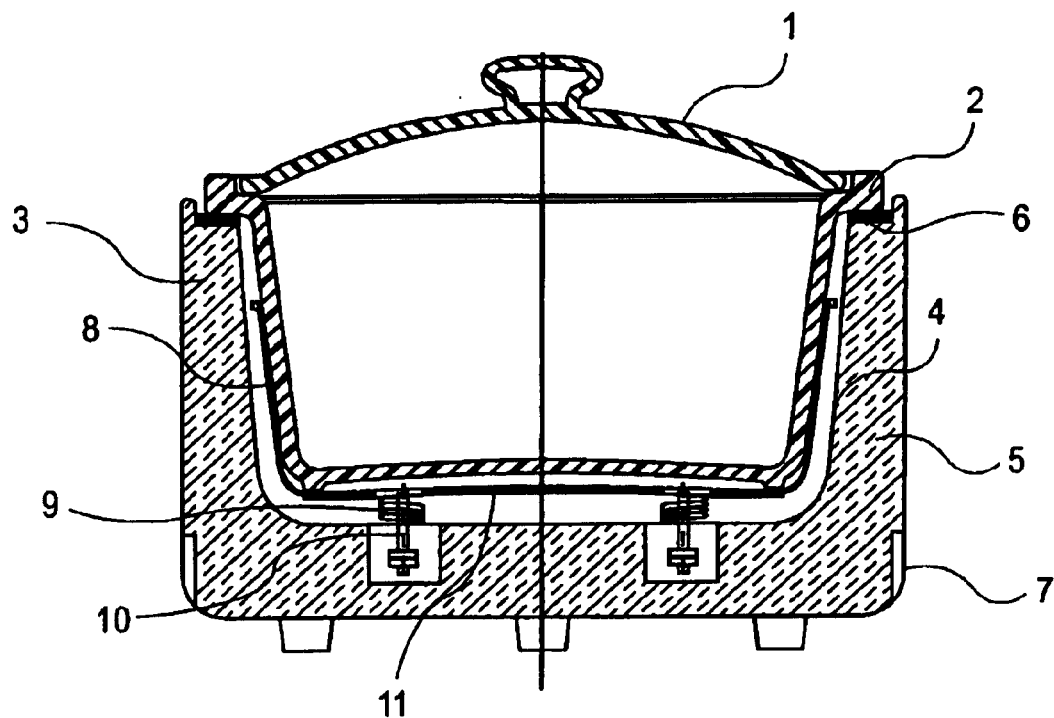
FIG. 3 is a drawing showing the structure of another embodiment of the slow cooker of this invention.

As shown in FIG. 3, a slow cooker comprises a lid 1, porcelain container 2, shell 3, inner casing 4, thermal insulating layer 5, heat-proof ring 6, pedestal 7, heater 11, heating case 8, springs 9 and bolts 10. The porcelain container is in the innermost space, and the inner casing with a heater and the shell are one after another in the outer space of the porcelain container. Heating case 8 is supported to inner casing 4 by springs 9 through bolts 10. Heater 11 is an electrical heating plate fixed to heating case 8.

Figure 4:
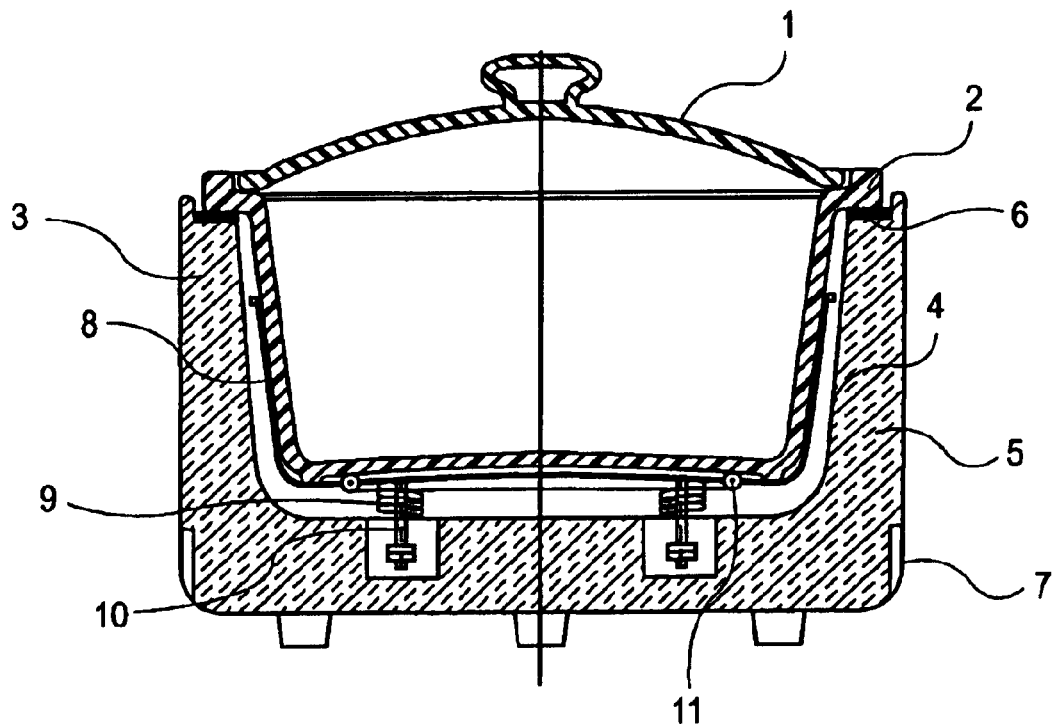
FIG. 4 is a drawing showing the structure of another embodiment of the slow cooker of this invention.

As shown in FIG. 4, a slow cooker comprises a lid 1, porcelain container 2, shell 3, inner casing 4, thermal insulating layer 5, heat-proof ring 6, pedestal 7, heater 11, heating case 8, springs 9 and bolts 10. The porcelain container is in the innermost space, and the inner casing with a heater and the shell are one after another in the outer space of the porcelain container. Heating case 8 is supported to inner casing 4 by springs 9 through bolts 10. Heater 11 is an electrical circular heating tube installed on heating case 8.

Figure 5:
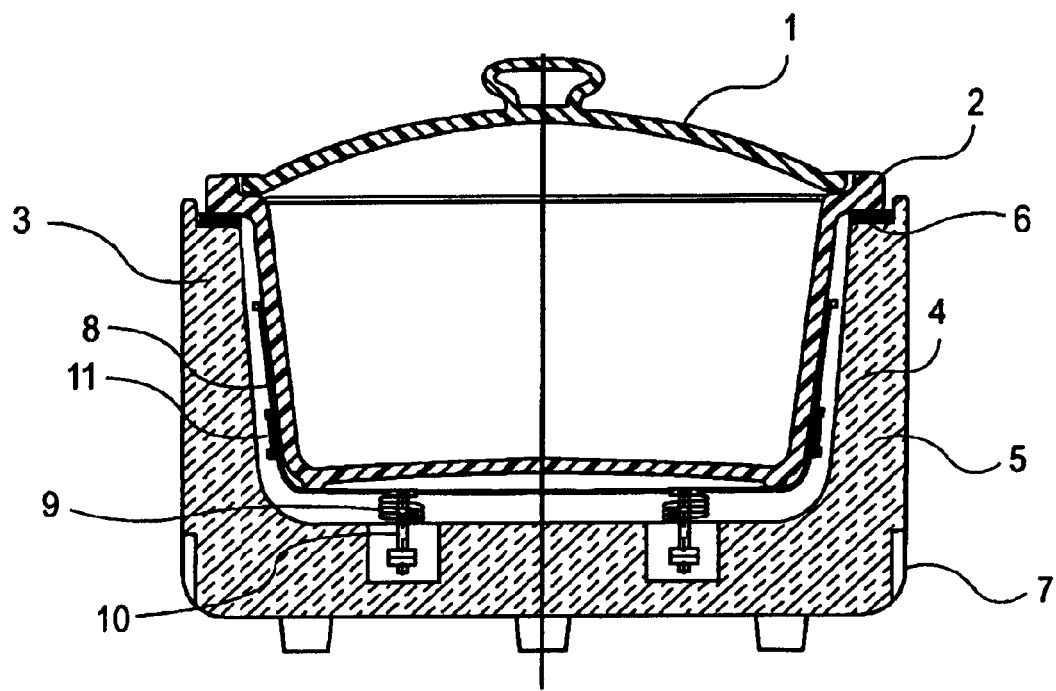
FIG. 5 is a drawing showing the structure of another embodiment of the slow cooker of this invention.

As shown in FIG. 5, a slow cooker comprises a lid 1, porcelain container 2, shell 3, inner casing 4, foaming thermal insulating layer 5, heat-proof ring 6, pedestal 7 and heater 11, heating case 8, springs 9 and bolts 10. The porcelain container is in the innermost space, and the inner casing with a heater and the shell are one after another in the outer space of the porcelain container. Heating case 8 is supported to inner casing 4 by springs 9 through bolts 10. Heater 11 is an electrical circular heating plate installed on heating case 8.

As described in the aforesaid embodiments, the electrical heating plate, the electrical circular heating tube, and the electrical circular heating plate are all prior art. The heat-proof ring 6 is made of refractory plastics and thus possesses good heat-proof quality. Said thermal insulating layer 5 is formed by filling polyurethane material or other foaming materials to the gap between shell 3 and inner casing 4 as well as between pedestal 7 and inner casing 4. Aluminum silicate or glass fiber thermal insulating material may be used as the thermal insulating material. The body shell in accordance with the present invention may effectively prevent loss of heat from the container to the shell so that the temperature of the shell can be kept low and hence it becomes a so-called "cold outer shell". Said heating case 8 is supported to the inner side of the inner casing by springs 9 through bolts 10. Said heating case 8 can move up and down by springs 9 and bolts 10 so that it can closely contact porcelain container 2, which greatly improves heat transmission as well as energy conservation.

What is claimed is:

1. A slow cooker comprising a lid, a porcelain container, a shell, an inner casing, a pedestal and a heater, the porcelain container capable of being covered by the lid and the porcelain container being positioned inside the inner casing where the heater is equipped, the inner casing being surrounded by the shell, and the shell and the pedestal being connected, wherein the slow cooker further comprising a thermal insulating layer, which is formed by filling a foamed material between the shell and the inner casing as well as between the pedestal and the inner casing so that when the porcelain container is inserted into the inner casing there is no gap between the inner casing and the porcelain container.

2. A slow cooker as defined in claim 1, wherein it further comprises a thermal insulation ring installed on the upper portion of the shell and inner casing.

3. A slow cooker as defined in claim 2, wherein it further comprises a heating case, springs and bolts, the heating case is supported to said inner casing by the springs through the bolts, and said heater is installed on the heating case.

4. A slow cooker as defined in claim 3, wherein said heater is a heating plate.

5. A slow cooker as defined in claim 3, wherein said heater is a circular heating tube.

6. A slow cooker as defined in claim 3, wherein said heater is a circular heating plate.

7. A slow cooker as defined in claim 1, wherein said foamed material is polyurethane.

8. A slow cooker comprising:
a container;
a lid configured to cover the container;
an inner casing configured to receive the container;
a shell configured to house the inner casing and the container;
a pedestal connected to the shell;
a heater associated with the inner casing, the heater being configured to heat the container; and
a thermal insulating layer comprising a foamed material between the shell and the inner casing and between the pedestal and the inner casing, the foamed material having an elasticity and being configured to be compressed when the container is inserted into the inner casing, thereby diminishing any gap between the inner casing and the porcelain container.

9. A slow cooker as defined in claim 8, wherein it further comprises a thermal insulation ring installed on the upper portion of the shell and inner casing.

10. A slow cooker as defined in claim 9, wherein it further comprises a heating case, springs and bolts, the heating case is supported to said inner casing by the springs through the bolts, and said heater is installed on the heating case.

11. A slow cooker as defined in claim 10, wherein said heater is a heating plate.

12. A slow cooker as defined in claim 10, wherein said heater is a circular heating tube.

13. A slow cooker as defined in claim 10, wherein said heater is a circular heating plate.

14. A slow cooker as defined in claim 8, wherein said foamed material is polyurethane.

15. A slow cooker comprising:
a container;
a lid configured to cover the container;
an inner casing configured to receive the container;
a shell configured to house the inner casing and the container;
a pedestal connected to the shell;
a heater associated with the inner casing, the heater being configured to heat the container; and
a thermal insulating layer comprising a foamed material between the shell and the inner casing and between the pedestal and the inner casing, the foamed material having an elasticity and being configured to be compressed when the container is inserted into the inner casing such that there is substantially no gap between the inner casing and the porcelain container.

16. A slow cooker as defined in claim 15, wherein it further comprises a thermal insulation ring installed on the upper portion of the shell and inner casing.

17. A slow cooker as defined in claim 16, wherein it further comprises a heating case, springs and bolts, the heating case is supported to said inner casing by the springs through the bolts, and said heater is installed on the heating case.

18. A slow cooker as defined in claim 17, wherein said heater is a heating plate.

19. A slow cooker as defined in claim 17, wherein said heater is one of a circular heating tube and a circular heating plate.

20. A slow cooker as defined in claim 15, wherein said foamed material is polyurethane.

* * * * *